(12) United States Patent  
Park et al.

(10) Patent No.: US 9,801,487 B2  
(45) Date of Patent: *Oct. 31, 2017

(54) STEAM COOKING APPARATUS

(71) Applicant: Samsung Electronics Co., Ltd., Suwon-si (KR)

(72) Inventors: Guen Yong Park, Hwaseong-si (KR); Jae Hyoun Kim, Hwaseong-si (KR); Han Seong Kang, Hwasung-si (KR); Yun Ic Hwang, Suwon-si (KR); Kyoung Ho Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

This patent is subject to a terminal disclaimer.

(21) Appl. No.: 14/636,626

(22) Filed: Mar. 3, 2015

(65) Prior Publication Data

US 2015/0173553 A1 Jun. 25, 2015

Related U.S. Application Data

(63) Continuation of application No. 13/453,182, filed on Apr. 23, 2012, now Pat. No. 8,997,638.

(30) Foreign Application Priority Data

Apr. 28, 2011 (KR) .......................... 10-2011-0040188

(51) Int. Cl.
*F24C 15/32* (2006.01)
*A21B 3/04* (2006.01)
(Continued)

(52) U.S. Cl.
CPC ............ *A47J 27/04* (2013.01); *A21B 3/04* (2013.01); *F16L 25/10* (2013.01); *F24C 15/003* (2013.01);
(Continued)

(58) Field of Classification Search
CPC ....... A47J 27/04; F24C 15/327; F24C 15/003; A21B 3/04
(Continued)

(56) References Cited

U.S. PATENT DOCUMENTS 3,774,008 A 11/1973 Maniscalco
4,298,206 A 11/1981 Kojima
(Continued)

FOREIGN PATENT DOCUMENTS

EP 1 783 430 A1 5/2007
JP 2008-267785 11/2008
(Continued)

OTHER PUBLICATIONS

Extended European Search Report for European Application No. 12165668.0, dated Sep. 6, 2012.
(Continued)

*Primary Examiner* — Reginald L Alexander
(74) *Attorney, Agent, or Firm* — Staas & Halsey LLP (57) ABSTRACT

A steam cooking apparatus includes a steam generating unit to generate steam from a supply of water, a steam container to cook food using the steam from the steam generating unit, a steam supply pipe coupled to the steam generating unit in order to supply the steam container with the steam generated by the steam generating unit, a steam pipe coupled to the steam container in order to supply the steam container with the steam passing through the steam supply pipe, and a steam pipe connection tube including a first connection portion coupled with the steam supply pipe and a second connection portion coupled with the steam pipe, the second connection portion coupled with the steam pipe being formed to have a diameter which is expanded toward the steam pipe so as to guide the steam pipe.

1 Claim, 6 Drawing Sheets

(51) Int. Cl.
*A47J 27/04* (2006.01)
*F16L 25/10* (2006.01)
*F24C 15/00* (2006.01)

(52) U.S. Cl.
CPC ....... *F24C 15/327* (2013.01); *A47J 2027/043* (2013.01)

(58) Field of Classification Search
USPC .................. 99/418, 415, 476; 219/401, 682; 126/21 A, 369
See application file for complete search history.

(56) References Cited

U.S. PATENT DOCUMENTS

| | | | |
|---|---|---|---|
| 4,655,192 A | | 4/1987 | Jovanovic |
| 4,810,856 A | * | 3/1989 | Jovanovic ............... A47J 27/04 126/20 |
| 5,404,803 A | | 4/1995 | Glucksman |
| 5,511,831 A | | 4/1996 | Barton |
| 6,040,564 A | * | 3/2000 | Ueda .................... H05B 6/6479 219/401 |
| 6,631,740 B1 | * | 10/2003 | Jackson .................. F16L 13/08 138/109 |
| 6,947,664 B1 | | 9/2005 | Yeh |
| 7,638,736 B2 | | 12/2009 | Adamczak et al. |
| 2006/0278630 A1 | * | 12/2006 | Sung ..................... B24B 49/105 219/401 |
| 2009/0250452 A1 | * | 10/2009 | Tse ........................ F24C 15/327 219/401 |

FOREIGN PATENT DOCUMENTS

| | | |
|---|---|---|
| KR | 10-2006-0040343 | 5/2006 |
| KR | 10-2006-0082472 | 7/2006 |
| KR | 10-1005637 | 12/2010 |

OTHER PUBLICATIONS

U.S. Notice of Allowance dated Dec. 5, 2014 in U.S. Appl. No. 13/453,182.
U.S. Office Action dated Aug. 8, 2014 in U.S. Appl. No. 13/453,182.
U.S. Appl. No. 13/453,182, filed Apr. 23, 2012, Guen Yong Park, et al., Samsung Electronics Co., Ltd.
Korean Office Action dated Mar. 10, 2017 in Korean Patent Application No. 10-2011-0040188.

* cited by examiner

STEAM COOKING APPARATUS

CROSS-REFERENCE TO RELATED APPLICATIONS

This application is a continuation of U.S. patent application Ser. No. 13/453,182 filed on Apr. 23, 2012, which claims the priority benefit of Korean Patent Application No. 10-2011-0040188 filed on Apr. 28, 2011 in the Korean Intellectual Property Office, the disclosures of which are incorporated herein by reference.

BACKGROUND

1. Field

The following description relates to a steam cooking apparatus to cook food using steam.

2. Description of the Related Art

Examples of a general heating cooking apparatus used to cook food include an electronic range using a high frequency, a gas oven to directly apply heat to food using a heater, an electric oven, and the like.

Among these heating cooking apparatuses, in the case of the electronic range, there may be many limitations as to the types of food which may be cooked using the same, and further, the taste of food may be deteriorated, as the food may be dried during cooking. Also, in the case of the gas oven and the electric oven, air having a relatively low density acts as the heat transfer medium between the heater and the food, and thus cooking time may be increased and efficiency may be lowered.

In recent years, a heating cooking apparatus (hereinafter, referred to as 'steam cooking apparatus') to supply food with heat using steam has been developed as an alternative plan to supplement the conventional heating cooking apparatuses as described above. When such a steam cooking apparatus is used, food is maintained at a proper moisture level so that the taste of food may be preserved. In addition, steam filled within a cooking chamber acts as an effective heat transfer medium, and thus cooking time may be shortened.

In general, the steam cooking apparatus supplies a steam container with steam, which is generated by a steam generating unit to heat water and generate the steam, and supply the steam through a pipe to cook food in the steam container.

SUMMARY

Therefore, it is an aspect to provide a steam cooking apparatus which has an improved structure of a steam pipe assembly, thereby being capable of easily coupling a steam pipe and a steam pipe connection tube, and preventing leakage of steam.

It is another aspect to provide a steam cooking apparatus which has an improved structure of a steam pipe assembly, thereby being capable of coupling a steam pipe connection tube and a cover casing so that the centers thereof match each other.

Additional aspects will be set forth in part in the description which follows and, in part, will be obvious from the description, or may be learned by practice of the invention.

In accordance with one aspect, a steam cooking apparatus includes a steam generating unit to generate steam from a supply of water, a steam container to cook food using the steam from the steam generating unit, a steam supply pipe coupled to the steam generating unit in order to supply the steam container with the steam generated by the steam generating unit, a steam pipe coupled to the steam container in order to supply the steam container with the steam passing through the steam supply pipe, and a steam pipe connection tube including a first connection portion coupled with the steam supply pipe and a second connection portion coupled with the steam pipe so that the steam supply pipe is connected with the steam pipe, the second connection portion coupled with the steam pipe being formed to have a diameter which is expanded toward the steam pipe so as to guide the steam pipe.

The steam pipe may include a first coupling portion coupled with the second connection portion of the steam pipe connection tube and a second coupling portion coupled with the steam container.

The first coupling portion of the steam pipe may be formed with a first protrusion, and the second coupling portion may be formed with a second protrusion.

The steam pipe may be formed of a straight pipe having a circular shape, and each of the first and second protrusions may have the same circular shape as the steam pipe while being formed to protrude in a radial direction of the steam pipe.

The first protrusion of the steam pipe may be coupled to come into close contact with the second connection portion of the steam pipe connection tube, thereby preventing leakage of the steam.

The second coupling portion of the steam pipe may be coupled with the steam container by a fastening member, and the fastening member may be fixed so as not to be moved toward the first coupling portion by the second protrusion formed at the second coupling portion of the steam pipe.

The steam pipe connection tube may be directly fixed to a cover casing so that a center of the steam pipe connection tube matches a center of a connection hole formed at the cover casing so as to connect the steam pipe connection tube and the steam pipe.

The steam pipe connection tube may be coupled with a coupling member, and the coupling member may be fixed to the cover casing by welding.

The coupling member may include a cover portion coupled to the steam pipe connection tube and an extended portion formed to extend in a radial direction of the cover portion from the cover portion so as to be welded to the cover casing.

The cover casing and the steam pipe connection tube may be simultaneously coated in a state in which the steam pipe connection tube is fixed to the cover casing by the coupling member.

In accordance with another aspect, a steam cooking apparatus to supply a steam container with steam generated by a steam generating unit so as to cook food includes a steam supply pipe coupled to the steam generating unit to move the steam, a steam pipe coupled to the steam container in order to supply the steam container with the steam passing through the steam supply pipe, a steam pipe connection tube to connect the steam supply pipe and the steam pipe so as to supply the steam container with the steam, and a cover casing to fix the steam pipe connection tube, the cover casing being formed with a connection hole to connect the steam pipe connection tube and the steam pipe, wherein the steam pipe connection tube is coupled with a coupling member, and the coupling member is welded to the cover casing so that the steam pipe connection tube is fixed to the cover casing.

The steam pipe connection tube may include a first connection portion coupled with the steam supply pipe and a second connection portion coupled with the steam pipe.

The second connection portion of the steam pipe connection tube may be formed to have a diameter which is expanded toward the steam pipe.

The steam pipe may include a first coupling portion coupled with the second connection portion of the steam pipe connection tube and a second coupling portion coupled with the steam container.

The first coupling portion of the steam pipe may be formed with a first protrusion, and the second coupling portion may be formed with a second protrusion.

The steam pipe may be formed of a straight pipe having a circular shape, and each of the first and second protrusions may have the same circular shape as the steam pipe while being formed to protrude in a radial direction of the steam pipe.

The first protrusion of the steam pipe may be coupled to come into close contact with the second connection portion of the steam pipe connection tube, thereby preventing leakage of the steam.

The second coupling portion of the steam pipe may be coupled with the steam container by a fastening member, and the fastening member may be fixed so as not to be moved toward the first coupling portion by the second protrusion formed at the second coupling portion of the steam pipe.

The coupling member may include a cover portion coupled to the steam pipe connection tube and an extended portion formed to extend in a radial direction of the cover portion from the cover portion so as to be welded to the cover casing.

The steam pipe connection tube may be directly fixed to the cover casing so that a center of the steam pipe connection tube matches a center of the connection hole formed at the cover casing.

In accordance with a further aspect, a steam cooking apparatus to supply a steam container with steam generated by a steam generating unit so as to cook food includes a steam supply pipe coupled to the steam generating unit to move the steam, a steam pipe connection tube including a first connection portion coupled with the steam supply pipe and a second connection portion formed to have a diameter which is expanded in a direction opposite to the first connection portion, and a steam pipe which is formed with a first coupling portion coupled to the second connection portion of the steam pipe connection tube and a second coupling portion coupled to the steam container, wherein the first coupling portion of the steam pipe is formed with a first protrusion coupled to come into close contact with the second connection portion, thereby preventing leakage of the steam.

The second coupling portion of the steam pipe may be formed with a second protrusion, and the second coupling portion may be coupled with the steam container by a fastening member.

The fastening member may be fixed so as not to be moved toward the first coupling portion by the second protrusion formed at the second coupling portion of the steam pipe.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout.

Figure 1:
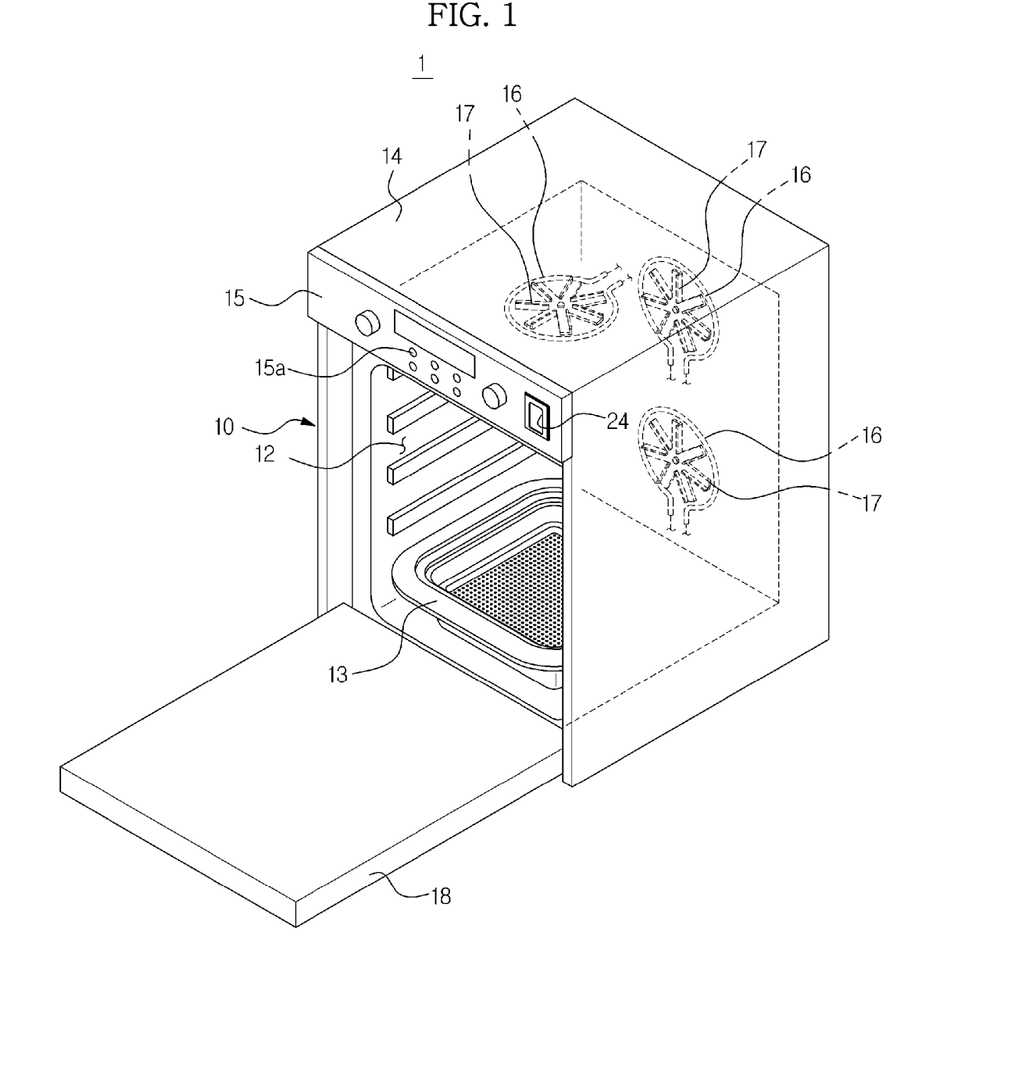
FIG. 1 is a perspective view illustrating a steam cooking apparatus according to an exemplary embodiment.
Figure 2:
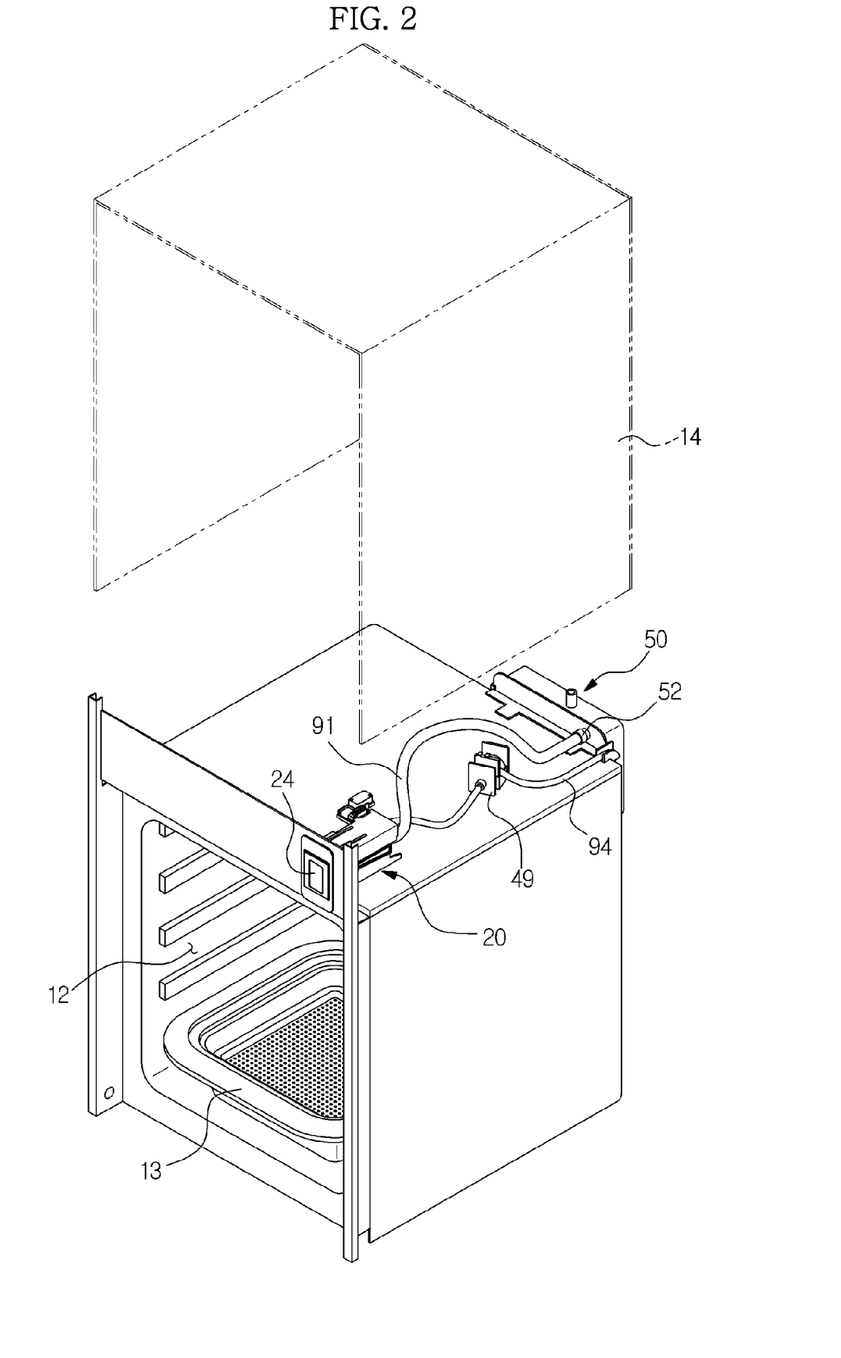
FIG. 2 is a perspective view illustrating the steam cooking apparatus from which a cover is separated in FIG. 1.
Figure 3:
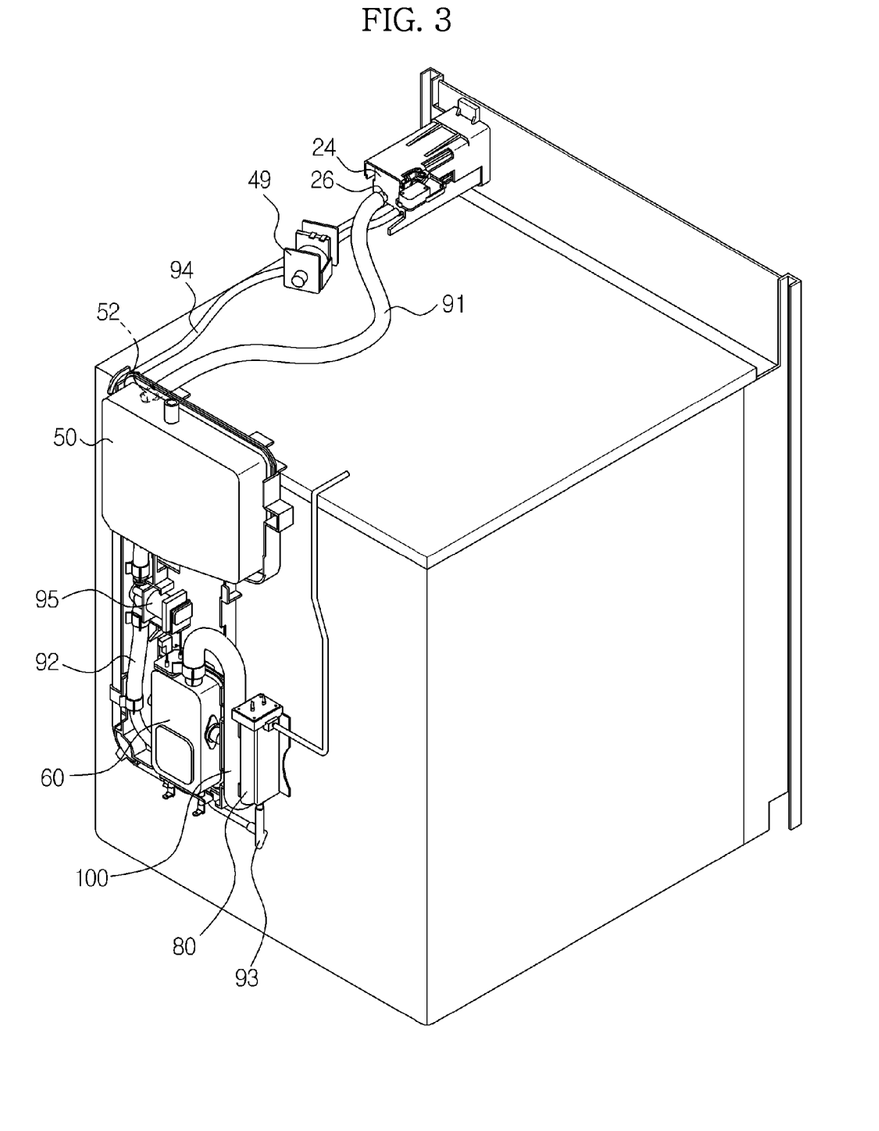
FIG. 3 is a perspective view illustrating the steam cooking apparatus of FIG. 2 as viewed from the rear.

As shown in FIGS. 1 to 3, a steam cooking apparatus, which is designated by reference numeral 1, includes a main body 10 to define an external appearance thereof while having a cooking chamber 12 within the main body 10, a cover 14 to cover an upper portion, opposite side portions, and a rear portion of the main body 10, convection heaters 16 and convection fans 17 arranged at the upper portion and the rear portion of the main body 10 in order to heat the cooking chamber 12, and a steam generating unit 60 to generate steam so as to supply the generated steam to a steam container 13 in the cooking chamber 12.

The main body 10 is opened at a front thereof to put food into or take food out of the cooking chamber 12, and the cooking chamber 12 on which food is placed is opened and closed by a door 18 coupled at the front of the main body 10.

The main body 10 is arranged, at an upper portion of the front surface thereof, with a control panel 15 which has a variety of operation switches 15a to allow a user to control operations of the steam cooking apparatus 1. The control panel 15 is arranged, at a side thereof, with a water supply unit 20 to supply the steam generating unit 60 with water.

The water supply unit 20 has a slider 24 capable of being withdrawn forward from the front surface of the main body 10. A user may supply water to or discharge water from the steam generating unit 60 by withdrawal of the slider 24.

The convection heaters 16 arranged at the upper portion and the rear portion of the main body 10 provide heat to heat food within the cooking chamber 12. On the other hand, the convection fans 17 circulate heat generated by the convection heater 16 in the cooking chamber 12 through convection, or evenly circulate the steam generated by the steam generating unit 60 at the steam container in the cooking chamber 12, independently of the convection heaters 16.

A first water supply tube 91 and a drainage pump 49 are located in a space between the upper portion of the main body 10 and the cover 14. The first water supply tube 91 connects the water supply unit 20 and a storage container 50, and the drainage pump 49 is connected with a drainage tube 94 to discharge water remaining within the steam generating unit 60 to the outside of the main body 10.

The first water supply tube 91 is coupled, at one end thereof, to a connection portion 26 of the slider 24 in the water supply unit 20 while being coupled, at the other end thereof, to an inlet 52 of the storage container 50 described below, thereby guiding the water supplied to the slider 24 into the storage container 50.

Since the connection portion 26 of the slider 24 is arranged at a relatively higher position than the inlet 52 of the storage container 50, an additional pump is not needed. Thus, the water supplied to the slider 24 is introduced into the storage container 50 along the first water supply tube 91 by gravity.

The first water supply tube 91 is frequently moved along with the slider 24 while the slider 24 is withdrawn in a forward direction of the main body 10 or inserted in an inward direction of the main body 10. Therefore, the first water supply tube 91 may be made of a material such as a synthetic resin or rubber, for example which is easily bent and does not undergo deformation in shape by repeated movement.

The storage container 50, the steam generating unit 60, and an auxiliary steam generating unit 80 are located in a space between the rear portion of the main body 10 and the cover 14. The storage container 50 temporarily stores the water supplied from the water supply unit 20, the steam generating unit 60 is arranged beneath the storage container 50 to generate steam through heating of the water supplied from the storage container 50 and supply the steam into the cooking chamber 12, and the auxiliary steam generating unit 80 is connected with the steam generating unit 60 while being provided with a water level measuring sensor (not shown) to measure a level of the water stored within the steam generating unit 60.

The storage container 50 is connected with the steam generating unit 60 through a second water supply tube 92, and the steam generating unit 60 is connected with the auxiliary steam generating unit 80 through a third water supply tube 93.

The second water supply tube 92 serves to guide the water stored within the storage container 50 to the steam generating unit 60 when the steam is required to be supplied into the cooking chamber 12. The third water supply tube 93 allows the steam generating unit 60 and the auxiliary steam generating unit 80 to communicate with each other so that the level (a height from a bottom surface at which the steam cooking apparatus 1 is installed to a surface of the water stored within the steam generating unit 60) of the water stored within the steam generating unit 60 and the level (a height from the bottom surface at which the steam cooking apparatus 1 is installed to a surface of the water stored within the auxiliary steam generating unit 80) of the water stored within the auxiliary steam generating unit 80 are actually maintained equal to each other.

The second water supply tube 92 is coupled, at a partial section thereof, with a valve 95 to control an amount of the water which is moved from the storage container 50 to the steam generating unit 60, if necessary.

The steam generating unit 60 is connected, at a lower portion thereof, with the drainage tube 94 to discharge the water remaining within the steam generating unit 60 to the outside of the main body 10.

The drainage tube 94 is fixed, at one end thereof, to the slider 24 to be withdrawn out of the main body 10 together with the slider 24 in the course of discharging the water remaining within the steam generating unit 60 to the outside of the main body 10.

Hereinafter, a steam pipe assembly connecting the steam generating unit and the steam container in order to supply the steam container with the steam generated by the steam generating unit will be described in detail.

Figure 4:
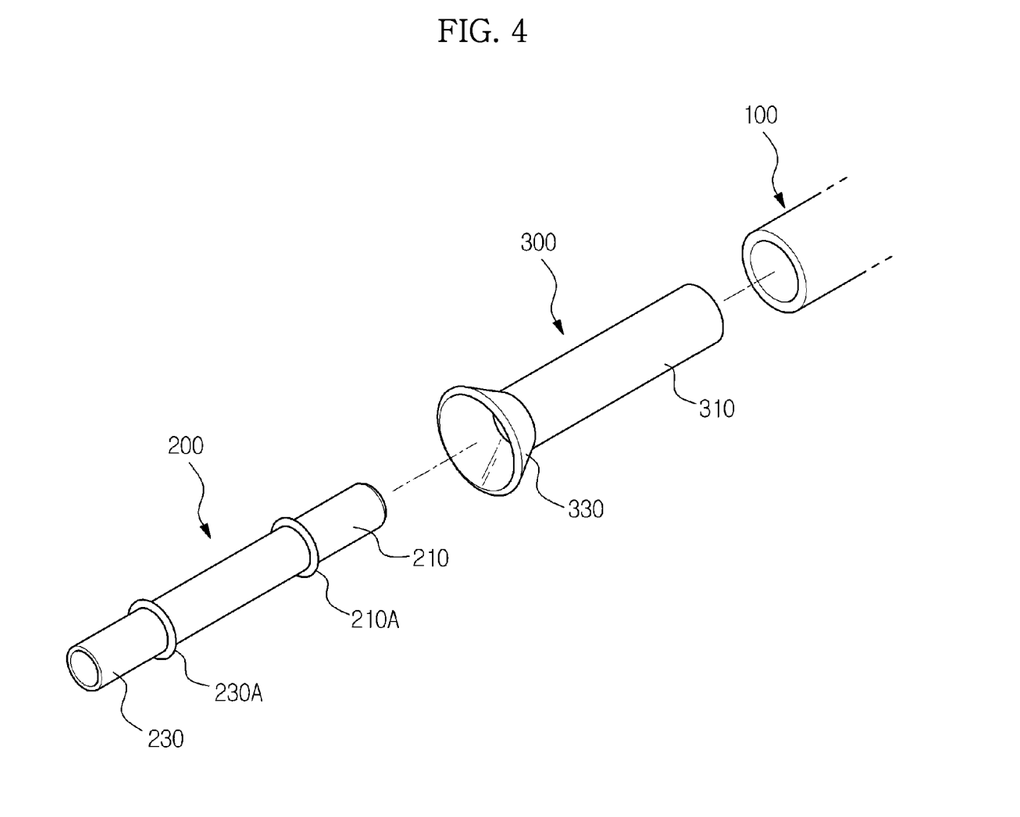
FIG. 4 is an exploded perspective view illustrating a steam pipe assembly according to the exemplary embodiment.
Figure 5:
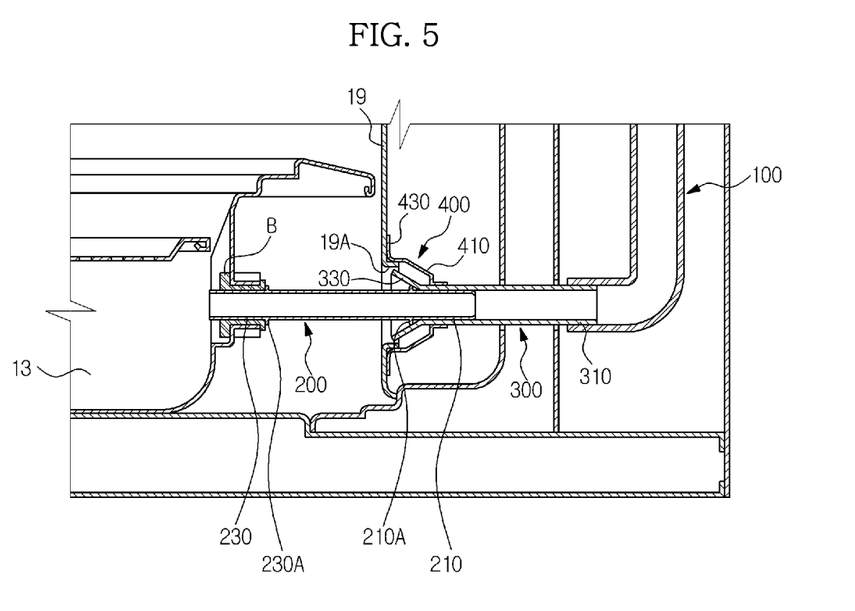
FIG. 5 is a side sectional view illustrating an appearance in which the steam cooking apparatus is coupled with the steam pipe assembly according to the exemplary embodiment.

As shown in FIGS. 3 to 5, the steam pipe assembly includes a steam supply pipe 100 coupled to the steam generating unit 60, a steam pipe 200 coupled to the steam container 13, and a steam pipe connection tube 300 coupled, at opposite ends thereof, to the steam supply pipe 100 and the steam pipe 200 so as to connect the steam supply pipe 100 and the steam pipe 200.

The steam generated by the steam generating unit 60 is supplied to the steam container 13 through the steam pipe assembly so that food within the steam container 13 is cooked by the steam supplied to the steam container 13.

As shown in FIGS. 3 to 5, the steam supply pipe 100 is coupled to the steam generating unit 60 to serve as a passage to move the steam generated by the steam generating unit 60.

The steam supply pipe 100 may be made of a pipe formed of a material that is easily bent, such as rubber, for example.

The steam passing through the steam supply pipe 100 is moved through the steam pipe connection tube 300 coupled to the steam supply pipe 100 and the steam pipe 200 coupled to the steam pipe connection tube 300, and is then supplied to the steam container 13.

As shown in FIGS. 4 and 5, the steam pipe 200 supplies the steam container 13 with the steam which passes through the steam supply pipe 100 coupled to the steam generating unit 60 and the steam pipe connection tube 300 coupled to the steam supply pipe 100.

The steam pipe 200 is formed of a straight pipe having a circular shape. The steam pipe 200 includes a first coupling portion 210 coupled with the steam pipe connection tube 300 and a second coupling portion 230 coupled with the steam container 13.

The first and second coupling portions 210 and 230 of the steam pipe 200 are formed with first and second protrusions 210A and 230A, respectively. Each of the first and second protrusions 210A and 230A has the same circular shape as the steam pipe 200 while being formed to protrude in a radial direction of the steam pipe 200.

The first coupling portion 210 of the steam pipe 200 is inserted into and coupled to the steam pipe connection tube 300. When the first coupling portion 210 is inserted into the steam pipe connection tube 300, the first protrusion 210A formed at the first coupling portion 210 is coupled to come into close contact with an expanded second connection portion 330 of the steam pipe connection tube 300 described below.

In the case that the expanded second connection portion 330 of the steam pipe connection tube 300 is formed to have a high slope, when the first coupling portion 210 of the steam pipe 200 is deeply inserted into the steam pipe connection tube 300, the first protrusion 210A may come into close contact with and be coupled to the second connection portion 330. On the other hand, in the case that the second connection portion 330 is formed to have a low slope, even when the first coupling portion 210 of the steam pipe 200 is slightly inserted into the steam pipe connection tube 300, the first protrusion 210A may come into close contact with and be coupled to the second connection portion 330.

Since the first protrusion 210A formed at the first coupling portion 210 of the steam pipe 200 comes into close contact with and is coupled to the expanded second connection portion 330 of the steam pipe connection tube 300, it may be possible to prevent leakage of the steam supplied from the steam generating unit 60 to the steam container 13.

The second coupling portion 230 of the steam pipe 200 is fitted with a fastening member B. The second coupling portion 230 of the steam pipe 200 is coupled with the steam container 13 by the fastening member B.

The fastening member B fitted to the second coupling portion 230 of the steam pipe 200 is fixed so as not to be moved toward the first coupling portion 210 by the second protrusion 230A formed at the second coupling portion 230.

Figure 6:
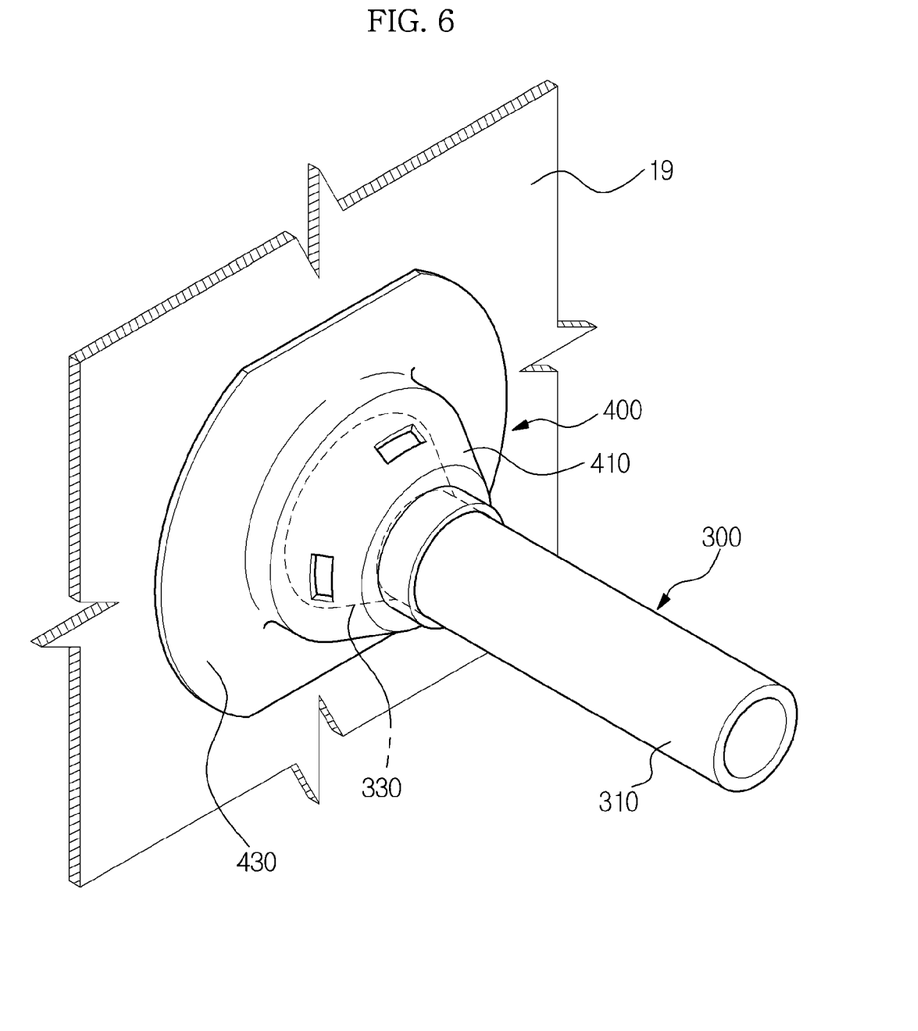
FIG. 6 is a perspective view illustrating an appearance in which a coupling member is coupled to a steam pipe connection tube of the steam pipe assembly according to the exemplary embodiment.

As shown in FIGS. 4 to 6, the steam pipe connection tube 300 connects the steam supply pipe 100 and the steam pipe 200, thereby supplying the steam container 13 with the steam generated by the steam generating unit 60.

The steam pipe connection tube 300 includes a first connection portion 310 coupled with the steam supply pipe 100 and a second connection portion 330 coupled with the steam pipe 200.

The first connection portion 310 of the steam pipe connection tube 300 is inserted into and coupled to the steam supply pipe 100. The second connection portion 330 coupled with the steam pipe 200 is formed to have a diameter which is expanded toward the steam pipe 200.

Since the second connection portion 330 of the steam pipe connection tube 300 is expanded and formed, the expanded second connection portion 330 guides the steam pipe 200 to lead insertion of the steam pipe 200 when the steam pipe 200 is coupled to the steam pipe connection tube 300.

Although the steam pipe 200 is not exactly coupled to the steam container 13 due to assembly and processing tolerance, the steam pipe 200 may be easily coupled to the steam pipe connection tube 300 by the expanded second connection portion 330 of the steam pipe connection tube 300 to which the steam pipe 200 is coupled.

Since the first coupling portion 210 of the steam pipe 200 coupled to the second connection portion 330 of the steam pipe connection tube 300 is formed with the first protrusion 210A protruding in the radial direction of the steam pipe 200, the first protrusion 210A comes into close contact with and is coupled to the expanded second connection portion 330 when the steam pipe 200 is coupled to the steam pipe connection tube 300. As a result, it may be possible to prevent leakage of the steam supplied from the steam generating unit 60 to the steam container 13.

The steam pipe connection tube 300 coupled with the steam pipe 200 is fixed to a cover casing 19.

The steam pipe connection tube 300 is coupled with a coupling member 400 in order to fix the steam pipe connection tube 300 to the cover casing 19. The coupling member 400 is welded to the cover casing 19 so that the steam pipe connection tube 300 is fixed to the cover casing 19.

The coupling member 400 includes a cover portion 410 coupled to the steam pipe connection tube 300 and an extended portion 430 formed to extend in a radial direction of the cover portion 410 from the cover portion 410.

The cover portion 410 of the coupling member 400 is formed to have a shape which wraps an outer portion of the expanded second connection portion 330 of the steam pipe connection tube 300 to be coupled to the steam pipe connection tube 300. The extended portion 430 is welded to the cover casing 19 so as to allow the steam pipe connection tube 300 to be fixed to the cover casing 19.

The cover casing 19 is formed with a connection hole 19A to connect the steam pipe connection tube 300 with the steam pipe 200. The extended portion 430 of the coupling member 400 is welded around the connection hole 19A of the cover casing 19.

Since the coupling member 400 is directly welded around the connection hole 19A of the cover casing 19, a center of the steam pipe connection tube 300 may exactly match a center of the connection hole 19A formed at the cover casing 19 when the steam pipe connection tube 300 is fixed to the cover casing 19, thereby enabling fixation of the steam pipe connection tube 300.

The cover casing 19 and the steam pipe connection tube 300 is coated in order to prevent rust. Since the steam pipe connection tube 300 is directly fixed to the cover casing 19 by the coupling member 400, the cover casing 19 and the steam pipe connection tube 300 may be simultaneously coated.

Since the cover casing 19 and the steam pipe connection tube 300 are simultaneously coated, processing costs due to a coating may be reduced, and an improved aesthetically pleasing external appearance may also be achieved.

As is apparent from the above description, in accordance with the exemplary embodiments, the steam pipe may be properly seated and coupled to the steam pipe connection tube during coupling of the steam pipe and the steam pipe connection tube, thereby enabling leakage prevention of steam being supplied to the steam container.

Furthermore, the steam pipe connection tube and the cover casing are assembled so that the centers thereof match each other, thereby enabling improvement in productivity and quality.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A steam cooking apparatus comprising:
   a steam generator to generate steam from a supply of water;
   a steam container to cook food using the steam from the steam generator;
   a steam supply pipe coupled to the steam generator;
   a steam pipe coupled to the steam container; and
   a steam pipe connection tube comprising a first connection portion coupled with the steam supply pipe and a second connection portion coupled with the steam pipe so that the steam supply pipe is connected with the steam pipe,
   wherein the steam pipe comprises a first coupling portion coupled with the second connection portion of the steam pipe connection tube and a second coupling portion coupled with the steam container, and
   wherein the first coupling portion of the steam pipe is formed with a first protrusion, and the second coupling portion is formed with a second protrusion.

* * * * *